United States Patent
Matsubara et al.

(10) Patent No.: US 6,290,012 B1
(45) Date of Patent: Sep. 18, 2001

(54) HYBRID VEHICLE CONTROL DEVICE (75) Inventors: Atsushi Matsubara; Kazutomo Sawamura; Shinichi Kitajima; Takashi Kiyomiya; Teruo Wakashiro; Takashi Iwamoto, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/625,965

(22) Filed: Jul. 26, 2000

(30) Foreign Application Priority Data

Jul. 30, 1999 (JP) .................................................. 11-218217

(51) Int. Cl.[7] ...................................................... B60K 1/00
(52) U.S. Cl. ........................ 180/65.4; 180/65.3; 701/110
(58) Field of Search ................................ 180/65.4, 65.3; 701/110

(56) References Cited

U.S. PATENT DOCUMENTS

| 5,806,617 | * | 9/1998 | Yamaguchi | 180/65.4 |
| 5,839,533 | * | 11/1998 | Mikami et al. | 180/65.3 |
| 5,898,282 | * | 4/1999 | Drozdz et al. | 180/65.4 |
| 6,123,163 | * | 9/2000 | Otsu et al. | 180/65.4 |
| 6,140,780 | * | 10/2000 | Oshima et al. | 180/65.3 |

FOREIGN PATENT DOCUMENTS 07-123509  5/1995  (JP) .

* cited by examiner

Primary Examiner—Douglas Hess
Assistant Examiner—Elaine Gort
(74) Attorney, Agent, or Firm—Armstrong, Westerman, Hattori, McLeland & Naughton, LLP (57) ABSTRACT A control device for a hybrid vehicle including an engine for outputting a propulsion force for the vehicle, a motor for assisting the output from the engine, and a storage unit for storing generated energy when the motor is used as a generator under the output from the engine and regenerated engine obtained from regenerative braking of the motor at the time of vehicle deceleration. Moreover, the control device includes an engine output detection device for detecting a change in output from the engine, and a motor control device for, in the case where an increase in output from the engine is detected at the time of vehicle traveling when the motor is not assisting the output from the engine, simultaneous with the increase in output, converting the increase amount in output into the generated energy using the motor.

3 Claims, 6 Drawing Sheets

HYBRID VEHICLE CONTROL DEVICE

BACKGROUND OF THE INVENTION

1. Field of the Invention

The present invention relates to a control device for a hybrid vehicle which is propelled by drive from an engine and a motor. In particular the invention relates to a control device for a hybrid vehicle for performing control of the driving force in the case where the output from the engine is rapidly increased from a situation where there is no assistance from the motor such as at the time of vehicle deceleration.

2. Description of the Related Art

Heretofore, there is known a hybrid vehicle incorporating a motor in addition to an engine as a drive source for vehicle propulsion. For one type of such hybrid vehicle, there is a parallel hybrid vehicle where the motor is used as an auxiliary drive source for assisting the output from the engine. With this parallel hybrid vehicle, for example, at the time of acceleration, the output from the engine is assisted by means of the motor, while at the time of deceleration, charging to a battery is performed by deceleration regeneration of the motor. Thus, with the parallel hybrid vehicle, various control is carried out, so that the residual capacity (electrical energy) of the battery can be maintained while satisfying the requirements of the driver. Such a parallel hybrid vehicle is disclosed, for example, in Japanese Patent Application, First Publication No. Hei 7-123509.

According to the control device for the abovementioned conventional hybrid vehicle, assistance (auxiliary drive) by the motor is provided during acceleration of the hybrid vehicle. However, in the case where, for example, after a condition where fuel supply to the engine has been stopped such as at the time of vehicle deceleration, fuel supply is suddenly reopened to move to acceleration, the driving force suddenly increases following the increase in output from the engine. Therefore, there is the problem of a sudden change occurring in the driving conditions of the hybrid vehicle. In order to address this problem, there is known a method where a sudden increase in driving force is suppressed by, for example, retarding the ignition timing of the engine, or by gradually increasing the throttle opening with the throttle actuator rather than following the movement of the throttle pedal, even in the case where the driver rapidly presses on the throttle pedal. However, with such a method where only the engine is controlled to suppress a rapid increase in the driving force, there is a problem of a deterioration in fuel consumption.

SUMMARY OF THE INVENTION

The present invention takes into consideration the above situation, with the object of providing a control device for a hybrid vehicle, which can suppress a rapid increase in driving force to maintain smooth travelling in the case where the output from the engine is increased in a situation where there is no assistance from the motor.

To achieve this object, a control device for a hybrid vehicle according to the present invention comprises characteristic devices. That is, the hybrid vehicle includes an engine for outputting a propulsion force for a vehicle, a motor for assisting the output from the engine, and a storage unit for storing generated energy when the motor is used as a generator under the output from the engine and regenerated energy obtained from regenerative braking of the motor at the time of vehicle deceleration. Moreover, the control device comprises an engine output detection device for detecting a change in output from the engine, and a motor control device for, in the case where an increase in output from the engine is detected at the time of vehicle travelling when the motor is not assisting the output from the engine, simultaneous with the increase in output, converting the increase amount in output into the generated energy using the motor.

According to the control device for a hybrid vehicle of the above construction, in the case where an increase in output from the engine is detected when the vehicle is travelling without the motor assisting the output from the engine such as for example at the time of vehicle deceleration, or at the time of cruise mode where the hybrid vehicle is travelling by the drive force of the engine without the motor driving, then simultaneous with this increase in output, the motor is regeneratively braked so that temporarily the increase amount in output is converted to generated energy. As a result, a sudden increase in drive force can be prevented, and the occurrence of a sudden change in the travelling conditions for the hybrid vehicle can be prevented. Furthermore, since the increase amount in the output is converted into generated energy, the storage unit can be charged by this, and a loss in energy due to the increase in drive force being suppressed can be prevented.

Here, simultaneous with the sudden increase in output from the engine, the motor is regeneratively braked so that temporarily the increase amount in output from the engine is converted into generated energy. After this, the amount out of the increase amount in output from the engine, which is converted into generated energy, may be gradually reduced, so that the amount of generated energy becomes zero at a point in time when motor assistance commences. In this way, the drive force can be smoothly increased, and the travelling feeling at the time of acceleration can be improved. Moreover, a lower limit threshold value for the amount of generated energy in this case may be set, and the decreasing of the amount of generated energy may be stopped at a point in time when this lower threshold value is reached. In this way, in the case where the amount out of the increase amount of the output from the engine, which is converted to generated energy, is gradually decreased in order to gradually transmit the increase amount in output from the engine as a drive force, due to the set lower limit threshold value, operation can be selectively moved to either of for example a condition where a comparatively small amount of generated energy is being produced such as a vehicle deceleration condition or in cruise mode, or a condition for an acceleration mode where the drive force of the engine is being assisted by the drive force from the motor.

DESCRIPTION OF THE PREFERRED EMBODIMENTS

Figure 1:
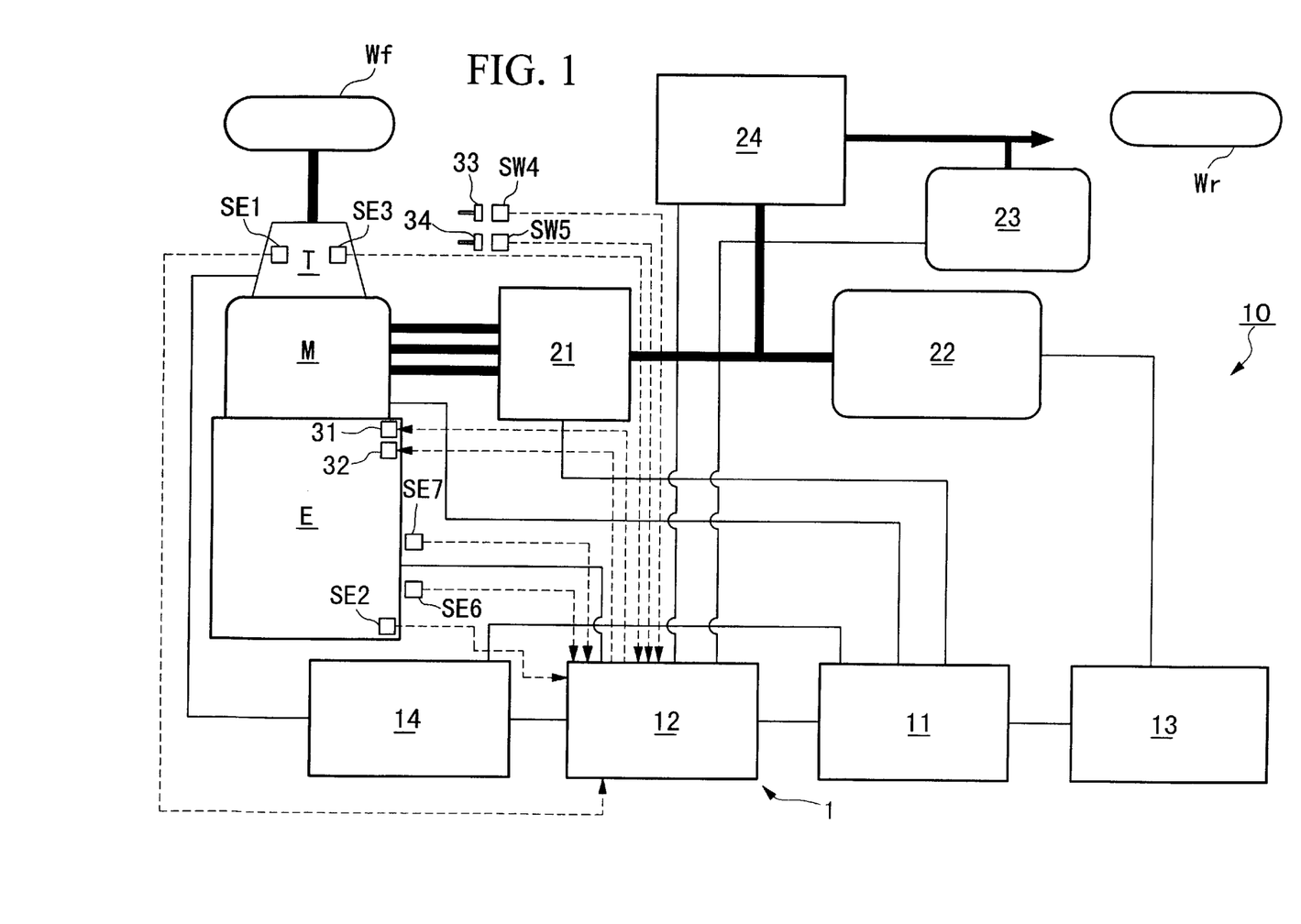
FIG. 1 is a schematic diagram of a hybrid vehicle incorporating a hybrid vehicle control device according to an embodiment of the present invention.

Hereunder is a description of embodiments of a control device for a hybrid vehicle according to the present invention, with reference to the appended drawings. FIG. 1 is a schematic diagram of a hybrid vehicle 10 incorporating a hybrid vehicle control device 1 according to a embodiment of the present invention.

The hybrid vehicle 10 corresponds for example to a parallel hybrid vehicle. The drive force from both an engine E and a motor M is transmitted to front wheels Wf, Wf (only one side wheel shown in FIG. 1) serving as drive wheels, via a transmission T comprising either an automatic transmission or a manual transmission. Furthermore, at the time of deceleration of the hybrid vehicle 10, a drive force in a reverse direction due to deceleration is transmitted to the motor M side from the front wheels Wf, Wf side. Due to this reverse direction drive force, the motor M functions as a generator to produce so called regenerative braking force, and thereby the kinetic energy of the vehicle is recovered as electrical energy.

The hybrid vehicle control device 1 according to this embodiment comprises a motor ECU 11, an FIECU 12, a battery ECU 13, and a CVTECU 14.

Control of the driving and regenerative braking of the motor M is performed by a power drive unit 21 which receives control instructions from the motor ECU 11. A battery 22 of a high voltage system for performing transfer of electrical energy with the motor M is connected to the power drive unit 21. The battery 22 is constructed from single units of modules where a plurality of cells are connected in series, with a plurality of these modules connected in series (this battery 22 corresponds to a "storage unit"). Also mounted on the hybrid vehicle 10 is a 12-volt auxiliary battery 23 for driving various auxiliary equipment. This auxiliary battery 23 is connected to the battery 22 via a down converter 24. The down converter 24 is controlled by the FIECU 12 and reduces the voltage of the battery 22 for charging the auxiliary battery 23.

The FIECU 12, in addition to controlling the operation of the motor ECU 11 and the down converter 24, controls the operation of a fuel supply quantity control section 31 for controlling the fuel supply quantity to the engine E, and controls the operation of a starter motor 32, and also controls the ignition timing. Therefore, to the FIECU 12 is input: a signal from a speed sensor SE 1 for detecting the vehicle speed V based on the revolving speed of a drive shaft in the transmission T; a signal from an engine revolution (revolving speed) sensor SE 2 for detecting an engine revolution per minute (revolving speed) NE; a signal from a shift position sensor SE 3 for detecting a shift position of the transmission T; a signal from a brake switch SW 4 for detecting an operation of a brake pedal 33; a signal from a clutch switch SW 5 for detecting an operation of a clutch pedal 34; a signal from a throttle opening sensor SE 6 for detecting a throttle opening degree θ TH; and a signal from an inlet pipe negative pressure sensor SE 7 for detecting inlet pipe negative pressure PB.

Further, the battery ECU 13 calculates the residual capacity SOC of the battery 22, and protects the battery 22. The CVTECU 14 controls the CVT.

Figure 2:
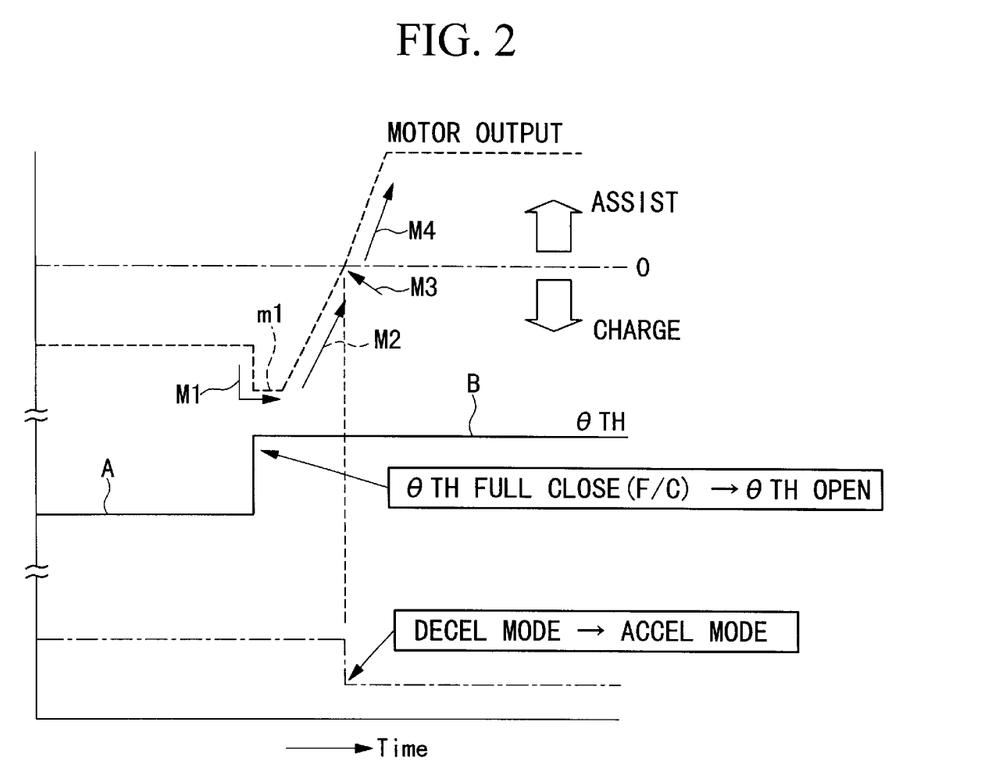
FIG. 2 is a diagram showing output from a motor M at the time of operation of the hybrid vehicle control device shown in FIG. 1.
Figure 5:
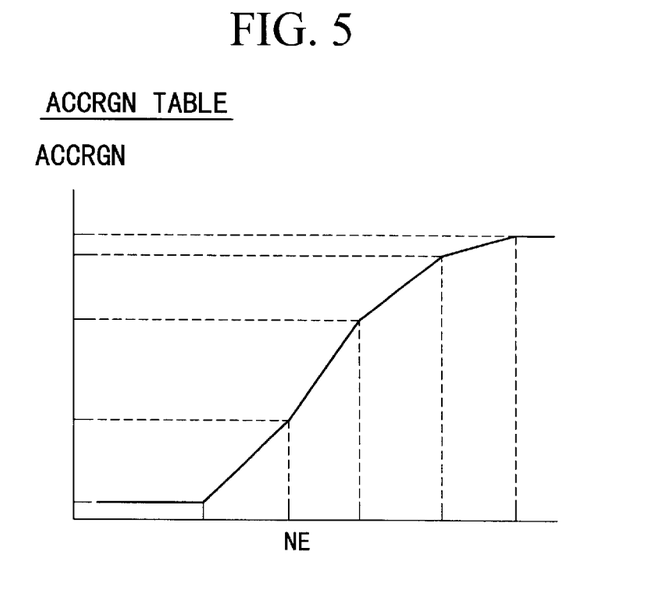
FIG. 5 is a graph showing charge amount table values ACCRGN with respect to engine revolution per minute (revolving speeds) NE.
Figure 6:
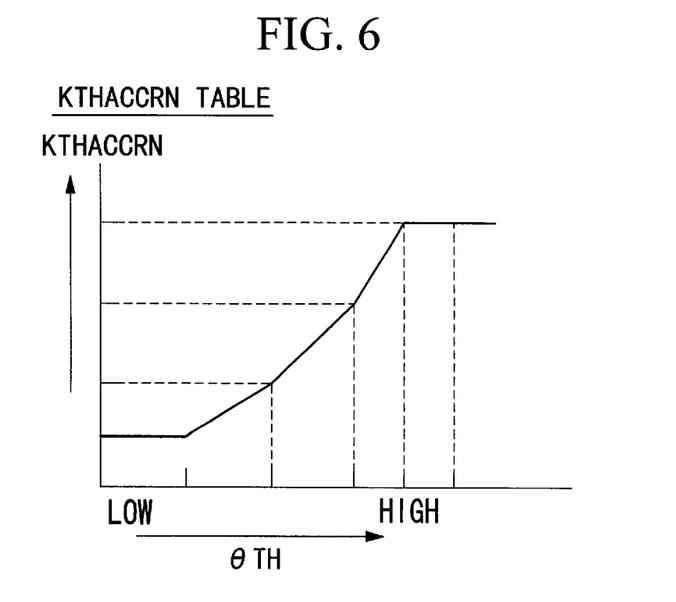
FIG. 6 is a graph showing correction amounts KTHAC-CRN for the charge amount table values ACCRGN corresponding to throttle opening degrees θ TH.
Figure 7:
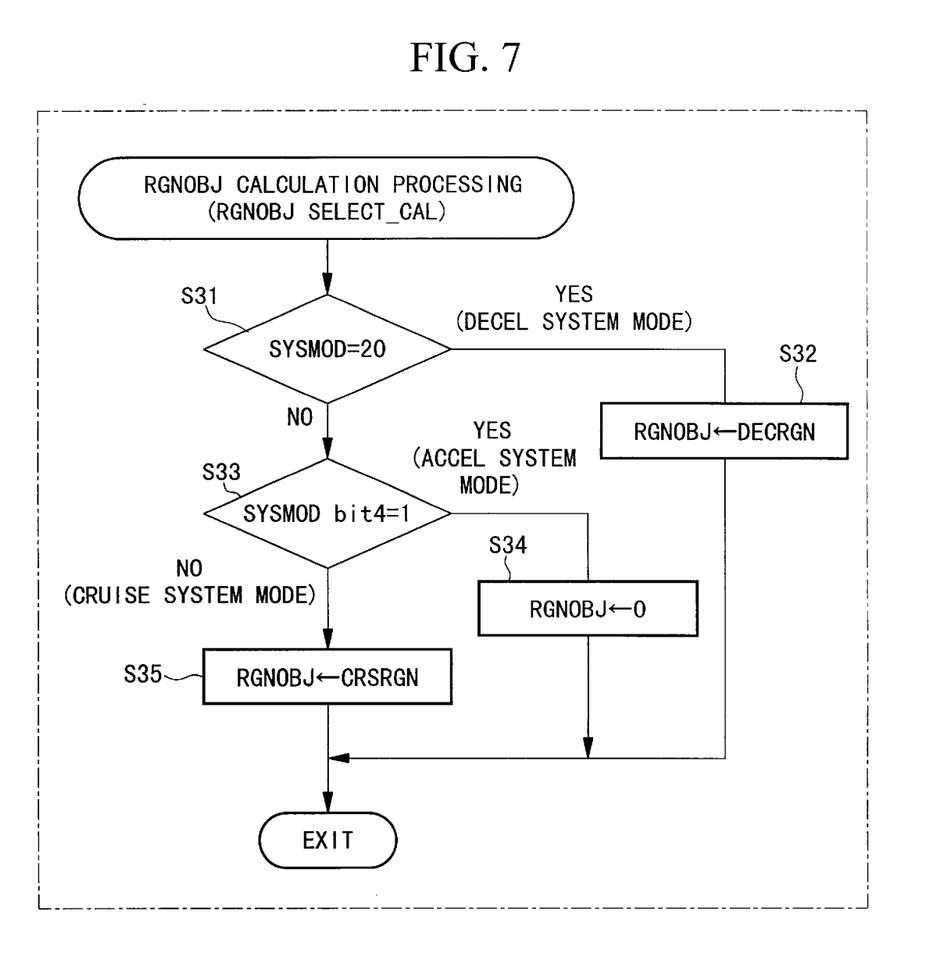
FIG. 7 is a flow chart showing an operation of a final objective charge amount RGNOBJ calculating process shown in FIG. 4 (step S16).

Next is a description of an operation of the hybrid vehicle control device 1 according to the embodiment incorporating the above construction, with reference to the appended drawings. FIG. 2 is a diagram showing output from the motor M at the time of operation of the hybrid vehicle control device 1 shown in FIG. 1, FIG. 3 and FIG. 4 are flow charts showing the operation of the hybrid vehicle control device 1 shown in FIG. 1, FIG. 5 is a graph showing charge amount table values ACCRGN with respect to engine revolution per minute NE, FIG. 6 is a graph showing correction amounts KTHACCRN for the charge amount table values ACCRGN corresponding to throttle opening degrees θ TH, and FIG. 7 is a flow chart showing an operation of a final objective charge amount RGNOBJ calculating process shown in FIG. 4 (step S16).

Figure 3:
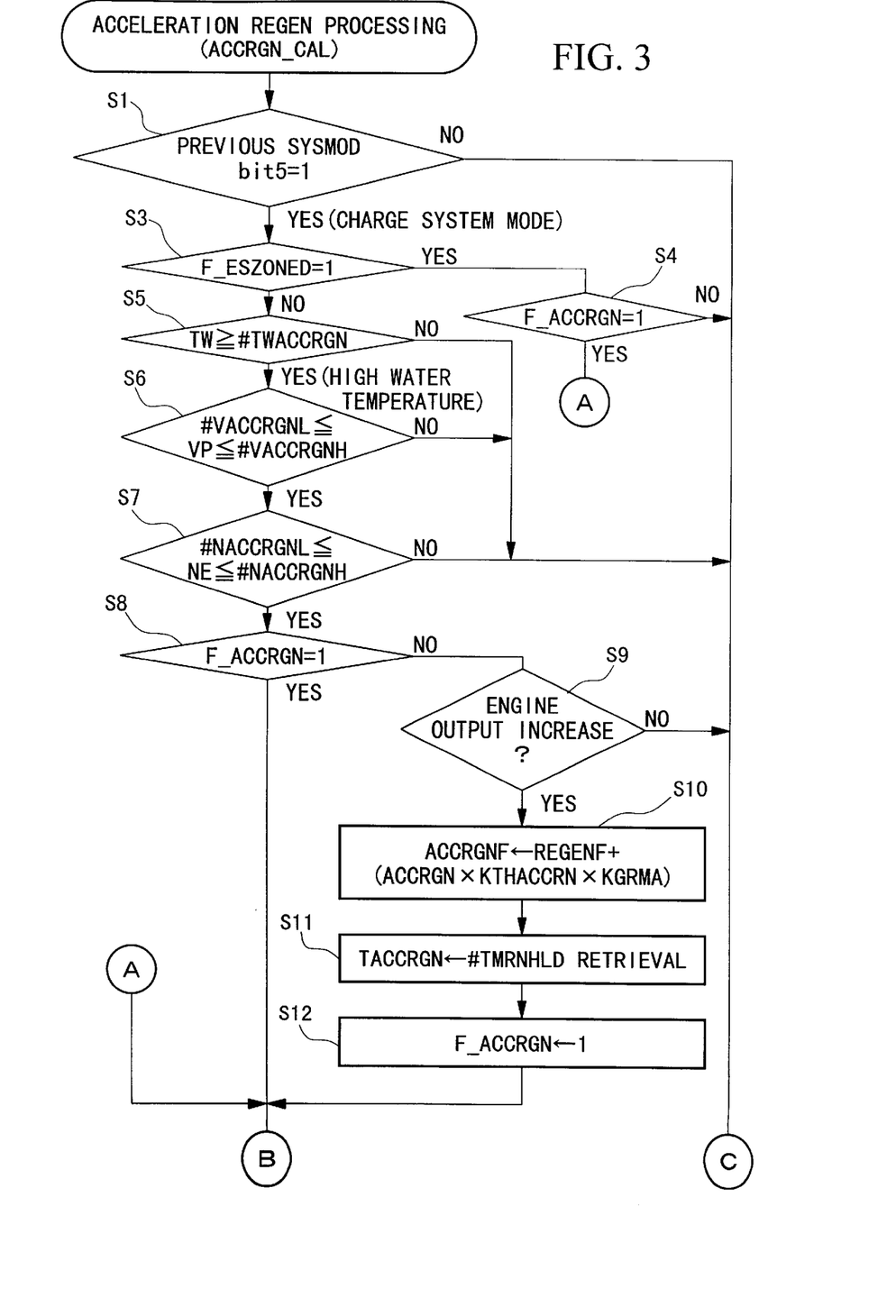
FIG. 3 is a flow chart showing an operation of the hybrid vehicle control device shown in FIG. 1.
Figure 4:
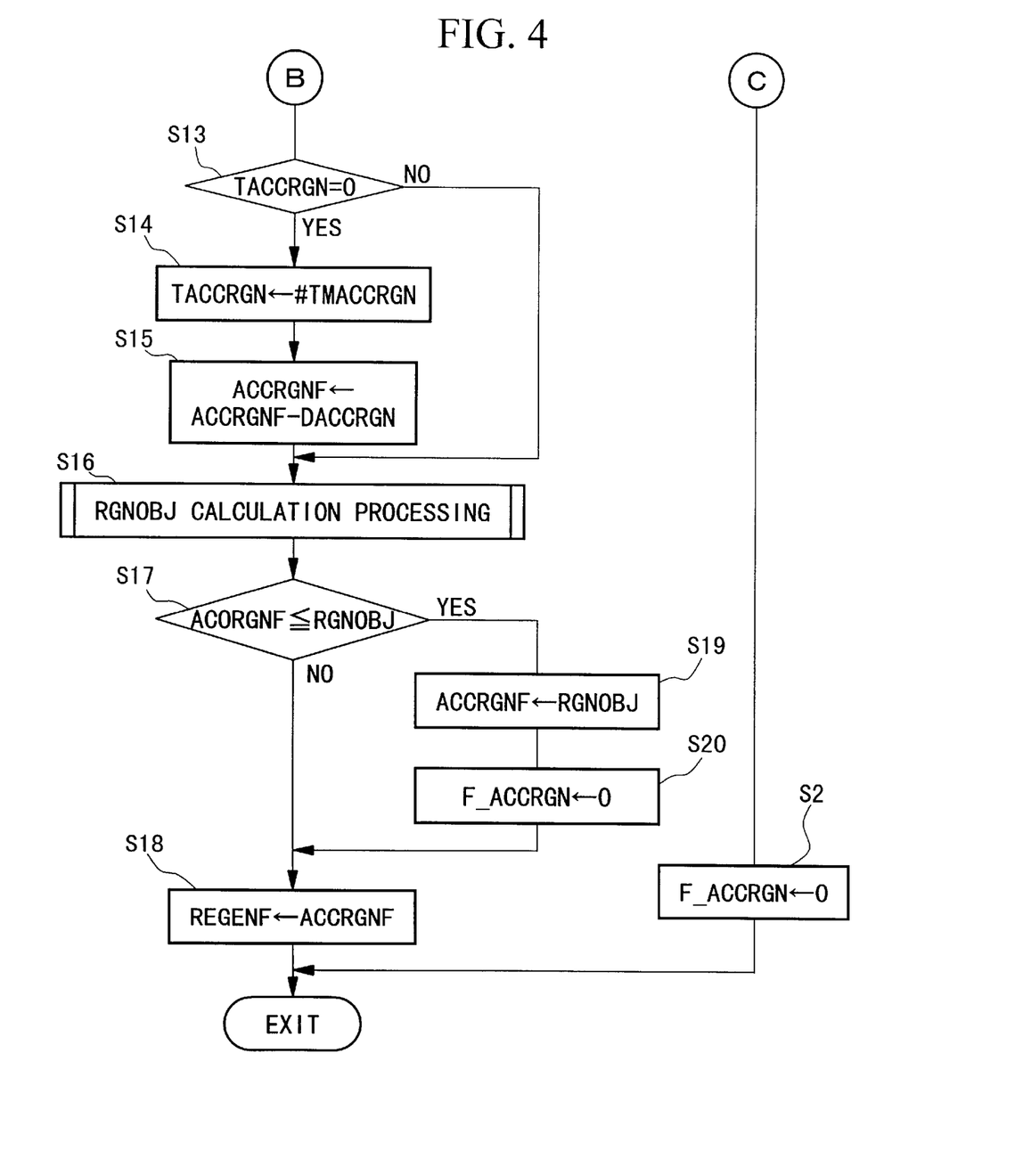
FIG. 4 is a flow chart showing an operation of the hybrid vehicle control device shown in FIG. 1 (the operation is shown by both FIGS. 3 and 4.).

Here, acceleration REGEN processing shown in FIG. 3 and FIG. 4, is executed when the processing moves from a condition as referred to by the symbol A in FIG. 2, where for example the throttle opening degree θ TH of the hybrid vehicle 10 is fully closed and the fuel supply to the engine E is stopped (F/C: fuel cut), to a condition as referred to by the symbol B in FIG. 2, where for example the throttle opening degree θ TH is opened and the fuel supply to the engine E is started. That is to say, the acceleration REGEN processing shown in FIG. 3 and FIG. 4 is executed at the time of shifting from a condition where there is no acceleration such as when the hybrid vehicle 10 is decelerating or is in a cruise condition, to an accelerating condition.

In the acceleration REGEN processing, at first it is judged if the operating mode of the motor M is in a charge system mode (step S1). Here, the charge system mode is a cruise charge mode where the hybrid vehicle 10 is travelling under drive force from the engine E without the motor M driving, or a deceleration mode where regenerative braking is being executed by the motor M. In the case where the judgment result of step S1 is "NO", then for example the operating mode of the motor M becomes an acceleration mode where the drive force from the engine E is being assisted by the drive force from the motor M. In this case, it is judged that there is no need to reduce the assist amount, and thereby a "O" is set for a permit flag F_ACCRGN for the acceleration REGEN processing (step S2) and the series of processing is terminated.

On the other hand, in the case where the judgment result of step S1 is "YES", it is judged if a "1" is set for a judgment flag F_ESZONED of an energy storage D (step S3). That is to say, it is judged if the battery residual capacity SOC of the battery 22 is equal to or greater than a predetermined amount. The region where the battery residual capacity SOC is equal to or greater than a predetermined amount, is the region where the battery 22 is in an overcharged condition. This region is set to a region where the battery residual capacity SOC computed by the battery ECU 13 for example based on voltage, charging current, temperature etc., gives a charging range of 80% or 90% to 100%, for example.

In the case where the judgment result in step S3 is "YES", it is judged if a "1" has been set for the permit flag F_ACCRGN for the acceleration REGEN processing (step S4). In the case where the judgment result of step S4 is "NO", it is judged for example that the battery 22 is in a condition close to fully charged and there is no room for any more charging, hence the processing of step S2 and thereafter is performed. Conversely, in the case where the judgment result of step S4 is "YES", the processing of step S13 and thereafter to be mentioned later is performed.

On the other hand, in the case where the judgment result of step S3 is "NO", it is judged if the engine water temperature TW is equal to or greater than a predetermined lower limit value #TWACCRGN (step S5). In the case where the judgment result of step S5 is "NO", the processing of step S2 and thereafter is performed. Conversely, in the case where the judgment result of step S5 is "YES", it is judged if the speed VP of the hybrid vehicle 10 is within a range from a predetermined lower limit value #VACCRGNL to a predetermined upper limit value #VACCRGNH (step S6).

In the case where the judgment result of step S6 is "NO", the processing of step S2 and thereafter is performed. Conversely, in the case where the judgment result of step S6 is "YES", it is judged if the engine revolution per minute NE is within a range from a predetermined lower limit value #NACCRGNL to a predetermined upper limit value #NACCRGNH (step S7).

In the case where the judgment result of step S7 is "NO", the processing of step S2 and thereafter is performed. Conversely, in the case where the judgment result of step S7 is "YES", it is judged if a "1" has been set for the permit flag F_ACCRGN for the acceleration REGEN processing (step S8).

In the case where the judgment result of step S8 is "YES", the processing of step S13 and thereafter to be mentioned later is performed. Conversely, in the case where the judgment result of step S8 is "NO", it is judged for example that the time is for initial execution of the acceleration REGEN processing, and the processing of step S9 and thereafter is performed.

In step S9, it is judged if the engine output has increased (the judgment processing function of step S9 corresponds to an "engine output detection device"). Here, the engine output is increased when the throttle opening degree θ TH is opened and the fuel supply to the engine E commences, for example. In the case where the judgment result of step S9 is "NO", the processing of step S2 and thereafter is performed.

On the other hand, in the case where the judgment result of step S9 is "YES", then corresponding to the increase amount in the drive force transmitted to the front wheels Wf, Wf (drive wheels) attributable to the increase in engine output, a new value is set for the charge amount ACCRGNF to be absorbed into the battery 22 by means of the motor M (step S10. Here the charge amount ACCRGNF corresponds to a "generated energy amount"). With this setting, at first a charge amount table value ACCRGN set with the change in engine revolution per minute NE as a variable, a correction amount KTHACCRN for the table value ACCRGN set with the change in the throttle opening degree θ TH as a variable, and a multiplication coefficient KGRMA set for each gear, are multiplied together to give a multiplication value (ACCRGN×KTHACCRN×KGRMA). Then, the obtained multiplication value is added to the charge amount ACCRGNF which has been set at the time of completion of the acceleration REGEN processing carried out the previous time, that is to say to a previous value REGENF, to give a new charge amount ACCRGNF. That is, in step S10, the value for where the before mentioned multiplication value is added to the previous value REGENF (REGENF+ACCRGN×KTHACCRN×KGRMA), is set as the charge amount ACCRGNF.

Here, the charge amount table value ACCRGN set with the engine revolution per minute NE as a variable, and the correction amount KTHACCRN for the table value ACCRGN set with the throttle opening degree θ TH as a variable, are respectively set for example as shown in FIG. 5 and FIG. 6. The multiplication coefficient KGRMA is selected from respective coefficients #KGRMAx (where x is a gear number) allocated for each gear, corresponding to the set gear at that time (i.e. the shift position indicated by the signal from the shift position sensor SE 3).

Next, in step S11, a value for a subtraction hold timer #TMRNHLD, which is selected from respective subtraction hold timers #TMRNHLDx (where x is a gear number) allocated for each gear, corresponding to the set gear, is set to a subtraction update timer TACCRGN, and for the time of this set subtraction hold timer #TMRNHLD a so called waiting time is set.

Furthermore, a "1" is set for the permit flag F_ACCRGN of the acceleration REGEN processing (step S12). As a result, the setting is such that following for example a change in the throttle opening degree θ TH of the hybrid vehicle 10 from a fully closed condition (A) to an open condition (B), as with the first condition of the motor output referred to by symbol M1 in FIG. 2, the motor output is momentarily changed to the charging side for only the charge amount ACCRGNF corresponding to the increase amount in engine output. That is to say, the sudden increase in the drive force accompanying the change in engine output is absorbed by the motor M. Hence, for example, the occurrence of acceleration with an accompanying sudden shock to the hybrid vehicle 10, is prevented.

Here, the processing from step S9 to step S12 is only executed once for the acceleration REGEN processing which is carried out repeatedly for example for each predetermined time, and until a "0" is set for the permit flag F_ACCRGN of the acceleration REGEN processing, there is no repeat execution (the processing function from step S10 to step S12 corresponds to a "motor control device").

Next, in step S13 it is judged if the value of the subtraction update timer TACCRGN is zero. In the case where the judgment result is "NO", the processing of step S16 and thereafter is performed. Consequently, in the case for example where as with the time of initial execution for the acceleration REGEN processing, step S13 is reached via the processing from step S9 to step S12, the processing of step S14 and thereafter is not carried out until the time for the subtraction hold timer #TMR D set in step S11 has elapsed and the value of the subtraction update timer TACCRGN has become zero. As a result, in the first condition M1 of the motor output shown in FIG. 2, a condition m1 is provided so that processing becomes stagnant on the charge side for the time of the subtraction hold timer #TMRNHLD.

On the other hand, in the case where the judgment result of step S13 is "YES", an appropriate predetermined time #TACCRGN is newly set for the subtraction update timer TACCRGN (step S14). Consequently, in the case where the acceleration REGEN processing is repeatedly carried out, then the processing of the next mentioned step S15 is performed with this predetermined time #TMACCRGN as the period.

In step S15, a charge amount subtraction value DACCRGN is selected corresponding to the set gear, from predetermined subtraction values #DACCRGNx (where "x" is the gear number) for the charge amounts set for respective gears, and the value for where the charge amount subtraction value DACCRGN is subtracted from the charge amount ACCRGNF is made a new charge amount ACCRGNF (the processing function of step S15 corresponds to a "generated energy amount subtraction device"). Consequently, when this acceleration REGEN processing is repeatedly carried out, then as with the second condition of the motor output referred to by symbol M2 in FIG. 2, the charge amount ACCRGNF is gradually subtracted, and the operating mode of the motor M heads towards the boundary point M3 for switching to the assist condition, so that the increase amount of the engine output is gradually transmitted to the front wheels Wf, Wf (the drive wheels) as the drive force.

Next in step S16, as described later, a final objective charge amount RGNOBJ is calculated as an index for determining the timing for completing the processing of step S15 in the case where this acceleration REGEN processing is repeatedly carried out (this final objective charge amount RGNOBJ corresponds to a "lower limit threshold value for generated energy amount", while the processing function of step S16 corresponds to a "generated energy amount lower limit threshold value setting device").

Then, in step S17, it is judged if the charge amount ACCRGNF is less than or equal to the final objective charge amount RGNOBJ. In the case where the judgment result is "NO", the charge amount ACCRGNF is newly set to the previously value REGENF (step S18). In this way, one series of processing is completed. After this, for example after a predetermined time, the acceleration REGEN processing is again repeated.

On the other hand, in the case where the judgment result of step S17 is "YES", the final objective charge amount RGNOBJ is set to the charge amount ACCRGNF (step S19). Then a "0" is set for the permit flag F_ACCRGN of the acceleration REGEN processing (step S20), and thereby one series of processing is completed.

Next is a description of the processing of the before mentioned step S16, that is to say the processing for calculating the final objective charge amount RGNOBJ, with reference to FIG. 7. Here corresponding to shifting of the operating mode of the motor M to any mode of the deceleration mode (DECEL SYSTEM MODE), the cruise charge mode (CRUISE SYSTEM MODE), or the acceleration mode (ACCEL SYSTEM MODE), the respective final objective charge amount RGNOBJ is calculated.

At first, in step S31, it is judged if the operating mode of the motor M has shifted to the deceleration mode. In the case where the judgment result of step S31 is "YES", a predetermined first upper limit value DECRGN is set to the final objective charge amount RGNOBJ (step S32). On the other hand, in the case where the judgment result of step S31 is "NO", it is judged if the operating mode of the motor M has shifted to the acceleration mode such as a fourth condition of the motor output referred to by symbol M4 in FIG. 2 (step S33).

In the case where the judgment result of step S33 is "YES", a zero is set for the final objective charge amount RGNOBJ (step S34). In this case, in the before mentioned acceleration REGEN processing, processing is performed until the charge amount ACCRGNF becomes less than the final objective charge amount RGNOBJ, that is to say less than zero.

On the other hand, in the case where the judgment result of step S33 is "NO", it is judged that the operating mode of the motor M has shifted to the cruise charge mode, and a predetermined second upper limit value CRSRGN is set for the final objective charge amount RGNOBJ (step S35).

Here, the first upper limit value DECRGN is set so that for example compared to the second upper limit value CRSRGN, DECRGN >CRSRGN results.

As described above, with the hybrid vehicle control device 1 according to this embodiment, the setting of the various parameters is made so that in the case where an increase in output from the engine E is detected in a condition where the motor M is not assisting the output from the engine E, as, for example, at the time of vehicle deceleration or in the cruise charge mode where the motor M is not driving and the hybrid vehicle 10 is traveling under the drive force of the engine E, then simultaneous with this increase in output, the charge amount ACCRGNF corresponding to the increase amount in engine output is temporarily for the time of the subtraction hold timer #TMRNHLD set in the subtraction update timer TACCRGN, charged to the battery 22 by means of the motor M. As a result, a sudden increase in drive force transmitted to the front wheels Wf, Wf (drive wheels) can be prevented. Therefore, the occurrence of a sudden change in travelling conditions for the hybrid vehicle can be prevented. Furthermore, since the increase amount in engine output is charged to the battery 22 as the charge amount ACCRGNF, a loss in energy due to the increase in drive force being suppressed can be prevented.

Here, the amount out of the increase amount in the output from the engine E, which is converted as charge amount ACCRGNF, is gradually decreased. Therefore, the increase amount in engine output is gradually transmitted as drive force, so that the travelling feeling at the time of acceleration can be improved.

Moreover, since the final objective charge amount RGNOBJ is set separately for each shift target mode, that is to say, for each of deceleration mode, cruise charge mode and acceleration mode, as the indicator (index) for stopping the subtraction processing of the charge amount ACCRGNF with respect to the gradually decreased charge amount ACCRGNF. Therefore, it is possible to selectively shift to each mode.

Here, in the abovementioned embodiments, in step S14, the appropriate predetermined time #TMACCRGN is newly set for the deceleration update timer TACCRGN. However, the invention is not limited to this, and the predetermined time #TMACCRGN may be zero.

Moreover, in the abovementioned embodiments, the acceleration REGEN processing is executed at the time of a shift from a condition where the throttle opening degree θTH of the hybrid vehicle 10 is fully closed and the fuel supply to the engine E is stopped, to a condition where fuel supply is commenced. However, the invention is not limited to this, and the acceleration REGEN processing may be executed at the time of a fluctuation correction such as when the air conditioner or the like is started and the drive force transmitted to the drive wheels is increased.

Furthermore, in the abovementioned embodiments, at the time of setting the charge amount ACCRGNF in step S10, the correction amount KTHACCRN for the table value ACCRGN set with the throttle opening degree θ TH as a variable, was used. However, the invention is not limited to this, and a correction amount for the table value ACCRGN set with the inlet pipe negative pressure PB as a variable, may be used.

In the above, embodiments of the present invention have been described in detail. However, the specific constructions are not limited to those forms, and design changes and the like within the scope which does not depart from the spirit of the present invention, are also included in the present invention.

What is claimed is:

1. A control device for a hybrid vehicle, said hybrid vehicle comprising an engine for outputting a propulsion force for the vehicle, a motor for assisting the output from said engine, and a storage unit for storing generated energy when said motor is used as a generator under the output from said engine and regenerated energy obtained from regenerative braking of said motor at the time of vehicle deceleration, wherein said control device comprises:

engine output detection means for detecting a change in output from said engine; and motor control means for, in the case where an increase in output from said engine is detected at the time of vehicle travelling when said motor is not assisting the output from said engine, simultaneous with said increase in output, converting the increase amount in output into said generated energy using said motor.

2. A control device for a hybrid vehicle according to claim 1, further comprising generated energy amount subtraction means for, when the increase amount in output from said engine is converted into said generated energy, gradually decreasing the generated energy amount out of the increase amount in output from said engine, which is converted into the generated energy, so that said generated energy amount becomes zero at a point in time when said motor starts to assist the output from said engine.

3. A control device for a hybrid vehicle according to claim 2, further comprising generated energy amount lower limit threshold value setting means for setting a lower limit threshold value for said generated energy amount, and wherein, the decreasing of said generated energy amount is stopped at a point in time when said generated energy amount reaches said lower limit threshold value.

* * * * *